United States Patent
Sareen et al.

(10) Patent No.: US 10,382,276 B2
(45) Date of Patent: Aug. 13, 2019

(54) CONTROL PLANE ROUTING SYSTEMS AND METHODS FOR PERVASIVE MAINTENANCE

(71) Applicant: Ciena Corporation, Hanover, MD (US)

(72) Inventors: Jatin Sareen, New Delhi (IN); Anand Kumar, New Dehli (IN)

(73) Assignee: Ciena Corporation, Hanover, MD (US)

( * ) Notice: Subject to any disclaimer, the term of this patent is extended or adjusted under 35 U.S.C. 154(b) by 516 days.

(21) Appl. No.: 15/236,532

(22) Filed: Aug. 15, 2016

(65) Prior Publication Data
US 2018/0007147 A1 Jan. 4, 2018

(30) Foreign Application Priority Data

Jul. 4, 2016 (IN) .............................. 201611022854

(51) Int. Cl.
*H04L 12/24* (2006.01)
(52) U.S. Cl.
CPC ........ *H04L 41/0893* (2013.01); *H04L 41/082* (2013.01)
(58) Field of Classification Search
CPC .......................................... H04L 41/00–41/26
See application file for complete search history.

(56) References Cited

U.S. PATENT DOCUMENTS

| | | | | |
|---|---|---|---|---|
| 2011/0134931 A1* | 6/2011 | Merwe | ................ | H04L 41/0816 370/401 |
| 2012/0072894 A1* | 3/2012 | Wang | ...................... | G06F 8/656 717/168 |
| 2015/0365288 A1* | 12/2015 | Van Der Merwe | ........................ | H04L 41/5051 370/254 |
| 2015/0372901 A1* | 12/2015 | Pacella | ................... | H04L 45/28 370/225 |
| 2016/0006799 A1* | 1/2016 | Khandelwal | ............ | H04L 41/20 709/226 |
| 2016/0043797 A1 | 2/2016 | Sareen et al. | | |
| 2016/0173367 A1 | 6/2016 | Sareen et al. | | |

OTHER PUBLICATIONS

A. Doria et al., General Switch Management Protocol (GSMP) Applicability, Informational Memo, The Internet Society, Jun. 2002, pp. 1-9.

(Continued)

*Primary Examiner* — Clayton R Williams
(74) *Attorney, Agent, or Firm* — Clements Bernard Walker PLLC; Christopher L. Bernard; Lawrence A. Baratta, Jr.

(57) ABSTRACT

Systems and methods for automatically accommodating one or more connections associated with a network resource targeted for maintenance in a network include receiving a request identifying the network resource for the maintenance; responsive to the network resource carrying no traffic, blocking the network resource during the maintenance; and, responsive to the network resource carrying traffic, attempting local recovery on all connections of the traffic to move the connections off of the network resource based on action at the local node, and, for the connections unable to locally recover, performing a network action through a control plane in the network to move the connections unable to locally recover off of the network resource.

20 Claims, 5 Drawing Sheets

(56) References Cited

OTHER PUBLICATIONS

E. Mannie, Generalized Multi-Protocol Label Switching (GMPLS) Architecture, Standards Track Document, The Internet Society, Oct. 2004, pp. 1-69.

A. Doria et al., Forwarding and Control Element Separation (ForCES) Protocol Specification, Standards Track Document, Internet Engineering Task Force (IETF), IETF Trust and the persons identified as the document authors, Mar. 2010, pp. 1-124.

ITU-T G.709/Y.1331, Telecommunication Standardization Sector of ITU, Series G: Transmission Systems and Media, Digital Systems and Networks, Interfaces for the optical transport network, Feb. 2012, pp. 1-238.

ITU-T G.8080/Y.1304, Telecommunication Standardization Sector of ITU, Series G: Transmission Systems and Media, Digital Systems and Networks, Architecture for the automatically switched optical network, Feb. 2012, pp. 1-124.

\* cited by examiner

CONTROL PLANE ROUTING SYSTEMS AND METHODS FOR PERVASIVE MAINTENANCE

CROSS-REFERENCE TO RELATED APPLICATION(S)

The present patent application/patent claims the benefit of priority of Indian Patent Application No. 201611022854, filed on Jul. 4, 2016, and entitled "CONTROL PLANE ROUTING SYSTEMS AND METHODS FOR PERVASIVE MAINTENANCE," the contents of which are incorporated in full by reference herein.

FIELD OF THE DISCLOSURE

The present disclosure generally relates to networking systems and methods. More particularly, the present disclosure relates to control plane routing systems and methods for pervasive maintenance.

BACKGROUND OF THE DISCLOSURE

Network resources, i.e., equipment such as line cards, line modules, optical modules, switching fabrics, switching modules, fibers, etc., undergo periodic planned maintenance, which require operator for movement of traffic to other redundant resources before performing maintenance on desired resource. Prior to maintenance, there is no conventional technique to know if movement of all the traffic, i.e., control plane connections, would be substantially hitless. This is known only after performing each operation one by one, after which traffic the traffic would already see a hit. This is because of oversubscription of bandwidth in control plane networks, i.e., just checking whether a protect route is present or not does not indicate whether all connections that are being rerouted will find resources. There are no graceful techniques for locally restoring traffic locally at a node. Conventional techniques include a manual switch of each control plane connection at a network level or movement of resources abruptly allowing the network to re-compute connection paths. For the manual switch, movement of connections before maintenance is a manual operation which requires manual effort, is time consuming, and cumbersome. Abrupt movement of resources, e.g., pulling a module, could result in high traffic hit times. In either case, the operator conventionally does not know if all connections could be restored prior to starting the movement. For example, if it was known in advance that all connections cannot be moved, the operator may choose to reschedule maintenance.

It would be advantageous to automate the process for efficiency and resiliency, i.e., error free with auto movement. As nodes and networks are growing in the capacity of ports, conventional ports support up to 200 Gb/s which has 160 Optical channel Data Unit-0 (ODU0) connections on a single port (or a combination of ODU0, ODU1, ODU2, etc.). Ports are also growing, and support is expected for 400 Gb/s, 500 Gb/s, and beyond, further causing difficulties in moving connections thereon.

BRIEF SUMMARY OF THE DISCLOSURE

In an exemplary embodiment, a method for automatically accommodating one or more connections associated with a network resource targeted for maintenance at a local node in a network includes receiving a request identifying the network resource for the maintenance; responsive to the network resource carrying no traffic, blocking the network resource during the maintenance; and, responsive to the network resource carrying traffic, attempting local recovery on all connections of the traffic to move the connections off of the network resource based on action at the local node, and, for the connections unable to locally recover, performing a network action through a control plane in the network to move the connections unable to locally recover off of the network resource. The network resource can include one or more devices in a node in the network with the traffic associated therewith, and wherein the one or more devices can include one or more of line cards, line modules, optical modules, switching fabrics, switching modules, fibers, and ports. The request can be received from one or more of a Network Management System (NMS), an Element Management System (EMS), and a Software Defined Networking (SDN) controller and the request can include a time and day for the maintenance and a policy indication as to whether or not the maintenance proceeds if all of the traffic cannot be accommodated. The network action can be initiated through control plane messages to originating nodes for all of the connections unable to locally recover, wherein the control plane messages indicate the network resource for avoidance in computing a new path.

The network action can be performed by originating nodes associated with each of the connections unable to locally recover, wherein the originating nodes can be configured to compute alternative routes for the connections unable to locally recover exclusive of the local node. The network action can include Make-Before-Break (MBB) connections which are set up first for all of the connections unable to locally recover and then initiated via a selector switch after all of the MBB connections are setup. The local recovery can include, for ports of the network resources not carrying traffic, locking these ports to avoid traffic during the maintenance, for ports of the network resources carrying traffic over an aggregated link, performing one of local span mesh restoration and protection switching, and, for switch modules of the network resources in the local node, rebalancing the traffic in the local node such that the switch modules are free of the traffic. The method can further include raising a standing condition for the network resource such that the network resource is ignored for routing during the maintenance. The blocking, the attempting, and the performing can be each automatically performed based on the request.

In another exemplary embodiment, an apparatus adapted to automatically accommodate one or more connections associated with a network resource targeted for maintenance at a local node in a network includes circuitry adapted to receive a request identifying the network resource for the maintenance; circuitry adapted to block the network resource during the maintenance responsive to the network resource carrying no traffic; and circuitry adapted to attempt local recovery on all connections of the traffic to move the connections off of the network resource based on action at the local node, and, for the connections unable to locally recover, circuitry adapted to cause a network action through a control plane in the network to move the connections unable to locally recover off of the network resource, responsive to the network resource carrying traffic. The network resource can include one or more devices in a node in the network with the traffic associated therewith, and wherein the one or more devices can include one or more of line cards, line modules, optical modules, switching fabrics, switching modules, fibers, and ports. The request can be received from one or more of a Network Management System (NMS), an Element Management System (EMS), and a Software Defined Networking (SDN) controller and the request can include a time and day for the maintenance and a policy indication as to whether or not the maintenance proceeds if all of the traffic cannot be accommodated. The network action can be initiated through control plane messages to originating nodes for all of the connections unable to locally recover, wherein the control plane messages indicate the network resource for avoidance in computing a new path.

The network action can be performed by originating nodes associated with each of the connections unable to locally recover, wherein the originating nodes can be configured to compute alternative routes for the connections unable to locally recover exclusive of the local node. The network action can include Make-Before-Break (MBB) connections which are set up first for all of the connections unable to locally recover and then initiated via a selector switch after all of the MBB connections are setup. The local recovery can include, for ports of the network resources not carrying traffic, locking these ports to avoid traffic during the maintenance, for ports of the network resources carrying traffic over an aggregated link, performing one of local span mesh restoration and protection switching, and, for switch modules of the network resources in the local node, rebalancing the traffic in the local node such that the switch modules are free of the traffic. The apparatus can further include circuitry adapted to raise a standing condition for the network resource such that the network resource is ignored for routing during the maintenance.

In a further exemplary embodiment, a node in a network adapted to automatically accommodate one or more connections associated with a network resource targeted for maintenance at a local node in a network includes one or more ports; and a controller communicatively coupled to the one or more ports, wherein the controller is configured to receive a request identifying the network resource for the maintenance, block the network resource during the maintenance responsive to the network resource carrying no traffic, and attempt local recovery on all connections of the traffic to move the connections off of the network resource based on action at the local node, and, for the connections unable to locally recover, circuitry adapted to cause a network action through a control plane in the network to move the connections unable to locally recover off of the network resource, responsive to the network resource carrying traffic. The network resource can include one or more devices in a node in the network with the traffic associated therewith, and wherein the one or more devices can include one or more of line cards, line modules, optical modules, switching fabrics, switching modules, fibers, and ports. The request can be received from one or more of a Network Management System (NMS), an Element Management System (EMS), and a Software Defined Networking (SDN) controller and the request can include a time and day for the maintenance and a policy indication as to whether or not the maintenance proceeds if all of the traffic cannot be accommodated.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to control plane routing systems and methods for pervasive maintenance. The systems and methods provide smart maintenance aware, adaptive control planes, where an operator can mark a specified day/time for specific maintenance and the control plane can dynamically adapt the affected resources accordingly, providing more accuracy in the traffic movement, reducing traffic hits, more efficiently moving the traffic, and lowering overall maintenance duration. For example, an operator can designate the specific maintenance at a specified time via a Network Management System (NMS), Software Defined Networking (SDN) controller, or the like. At or before the specified time, the network element(s) affected by the specific maintenance can use this designation to signal automatically (e.g., using Make-Before-Break (MBB)) and compute paths to accommodate any traffic affected by the specific maintenance. In an exemplary aspect, the systems and methods include specifying the maintenance with respect to a resource (again, equipment such as line cards, line modules, optical modules, switching fabrics, switching modules, fibers, etc.). The connections associated with the resource are moved prior to the maintenance and the systems and methods deal with the resource as a whole as opposed to individual connections.

In an exemplary embodiment, the systems and methods include a dual level recovery approached where first the affected network element(s) attempt local recovery of any connections affected by the specific maintenance. Local recovery is advantageous as it only involves the network element itself, e.g., switching between modules local to the network element. If the local recovery is not possible, then the network element(s) can use the control plane, i.e., control plane messaging to each originating (source) node of all connections affected by the specified maintenance. The local network element(s) can provide feedback to the originating nodes in the control plane messaging for policy. For example, the feedback can include whether the maintenance is non-forced/best effort (e.g., annual or periodic maintenance which could be done at another time) and the associated policy could be to move all, and, if this is not possible, move none (i.e., reschedule). The feedback can be the maintenance is forced/immediate, and the associated policy could be to move high priority critical connections first and if it is not possible to move all connections, proceed to move whatever connections can be moved.

In an exemplary embodiment, the systems and methods can preplan the connection movements through the control plane, i.e., offline path computation. Once it is determined that all connections can or cannot be moved, the operator can be given the option of implementing the actual moves. In this manner, the connections can be moved to the offline computed paths in a hitless manner. If it was determined that all connections cannot be moved, the operator could decide whether or not to defer the maintenance. Advantageously, the systems and methods enable auto-movement of connections for the specified maintenance. This provides an operator a per resource interface as opposed to the convention approach which is per connection. That is, the maintenance is specified for a resource (e.g., a line card, module, switch fabric, etc.), and the auto-movement is handled for the resource, not per connection. With increasing bandwidth of ports, the systems and methods have the resources remain the same, independent of the number of connections going through the resource. Thus, the systems and methods scale to larger port sizes without added complexity to the operator.

Exemplary Network

Figure 1:
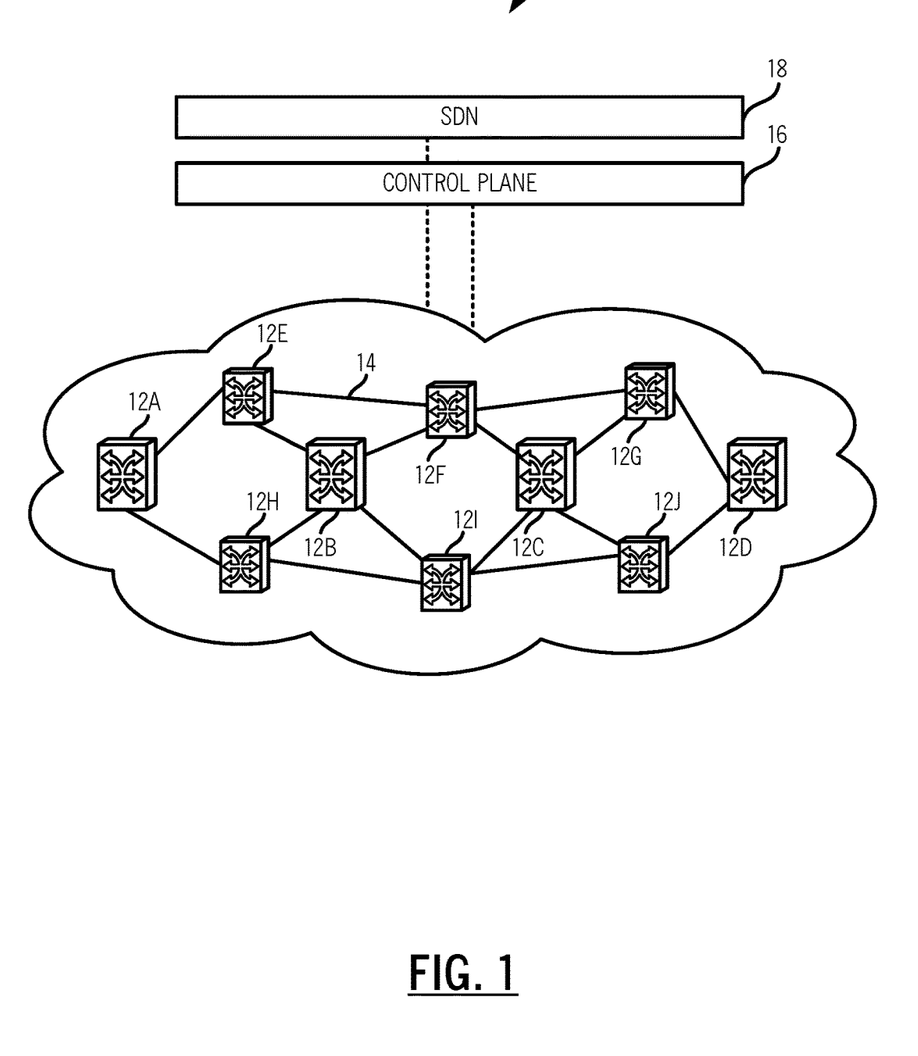
FIG. 1 is a network diagram of an exemplary network with various interconnected nodes for describing the control plane routing systems and methods for pervasive maintenance.

Referring to FIG. 1, in an exemplary embodiment, a network diagram illustrates an exemplary network 10 with various interconnected nodes 12 (illustrated as nodes 12A-12J) for describing the control plane routing systems and methods for pervasive maintenance. The nodes 12 are interconnected by a plurality of links 14. The nodes 12 communicate with one another over the links 14 through Layer 0 (L0) such as Dense Wavelength Division Multiplexing (DWDM), Layer 1 (L1) such as Optical Transport Network (OTN), Layer 2 (L2) such as Ethernet, Multiprotocol Label Switching (MPLS), etc., Layer 3 (L3) protocols, and/or combinations thereof. The nodes 12 can be network elements which include a plurality of ingress and egress ports forming the links 14. An exemplary node implementation is illustrated in FIG. 2. The network 10 can include various services or calls between the nodes 12. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc. as well as with various different interconnection topologies and architectures.

The network 10 can include a control plane 16 operating on and/or between the nodes 12. The control plane 16 includes software, processes, algorithms, etc. that control configurable features of the network 10, such as automated discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an exemplary embodiment, the control plane 16 can utilize Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) which is an optical signaling and routing protocol from Ciena Corporation similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane 16 can utilize any type of control plane for controlling the nodes 12 and establishing, maintaining, and restoring calls or services between the nodes 12.

A Software Defined Networking (SDN) controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports. Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows." In the various descriptions herein, reference is made to SNC or SNCP for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

Exemplary Network Element/Node

Figure 2:
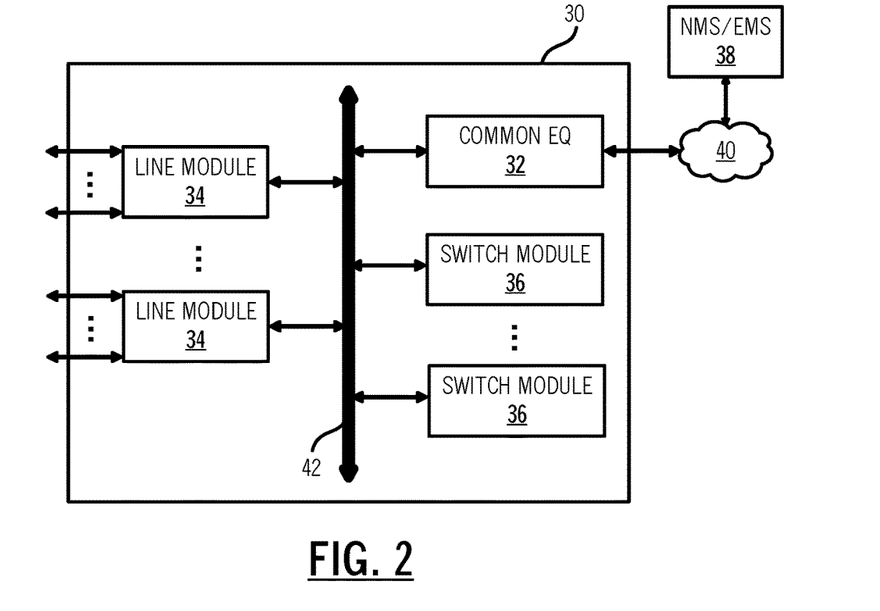
FIG. 2 is a block diagram of an exemplary node for use with the systems and methods described herein.

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

Exemplary Controller

Figure 3:
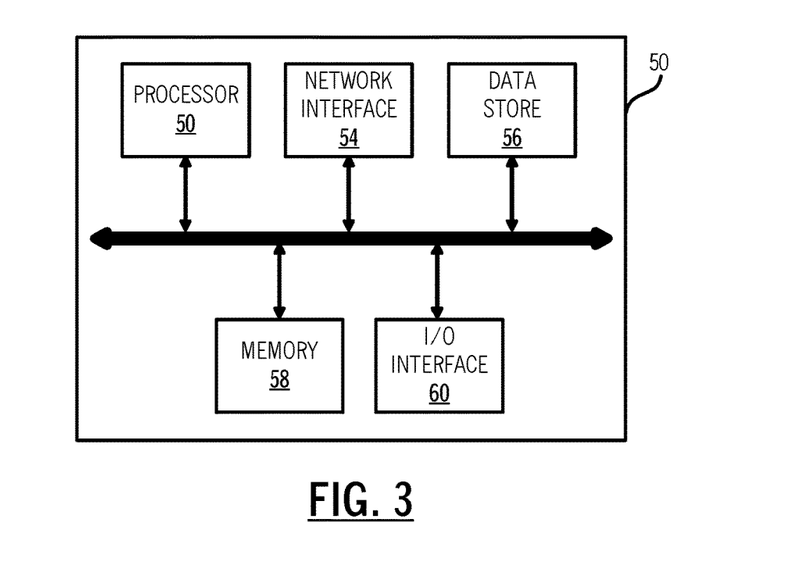
FIG. 3 is a block diagram of a controller to provide control plane processing and/or operations, administration, maintenance, and provisioning (OAM&P) for the node, and/or to implement a Software Defined Networking (SDN) controller.

Referring to FIG. 3, in an exemplary embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., 10BaseT, Fast Ethernet, Gigabit Ethernet) or a wireless local area network (WLAN) card. The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels may be used for in-band signaling or routing to carry control plane traffic. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

Resources for Maintenance

The systems and methods provide various techniques to accommodate connections associated with resources that undergo maintenance. Again, as described herein, a network resource includes a device, module, node, etc. that has connections associated therewith. For example, the resource could be the node 30, i.e., the entire node where all connections associated therewith have to be accommodated prior to maintenance. Here, the systems and methods would have to move all connections through the node 30 to other nodes 30. The resource could be a line module 34 with its associated ports where all connections through the line module 34 have to be accommodated prior to maintenance. Here, the systems and methods would have to reroute all connections through the line module 34, such as to other line modules 34 in the node 30 (local recovery) or through alternate paths (control plane recovery). The resource could be the switch module 36 where all connections through the switch module 36 have to be accommodated prior to maintenance. Here, the systems and methods would have to switch all connections off of the switch module 36 such as to another switch module 36 in the same node (local recovery) or through alternate paths (control plane recovery).

Maintenance Process

Figure 4:
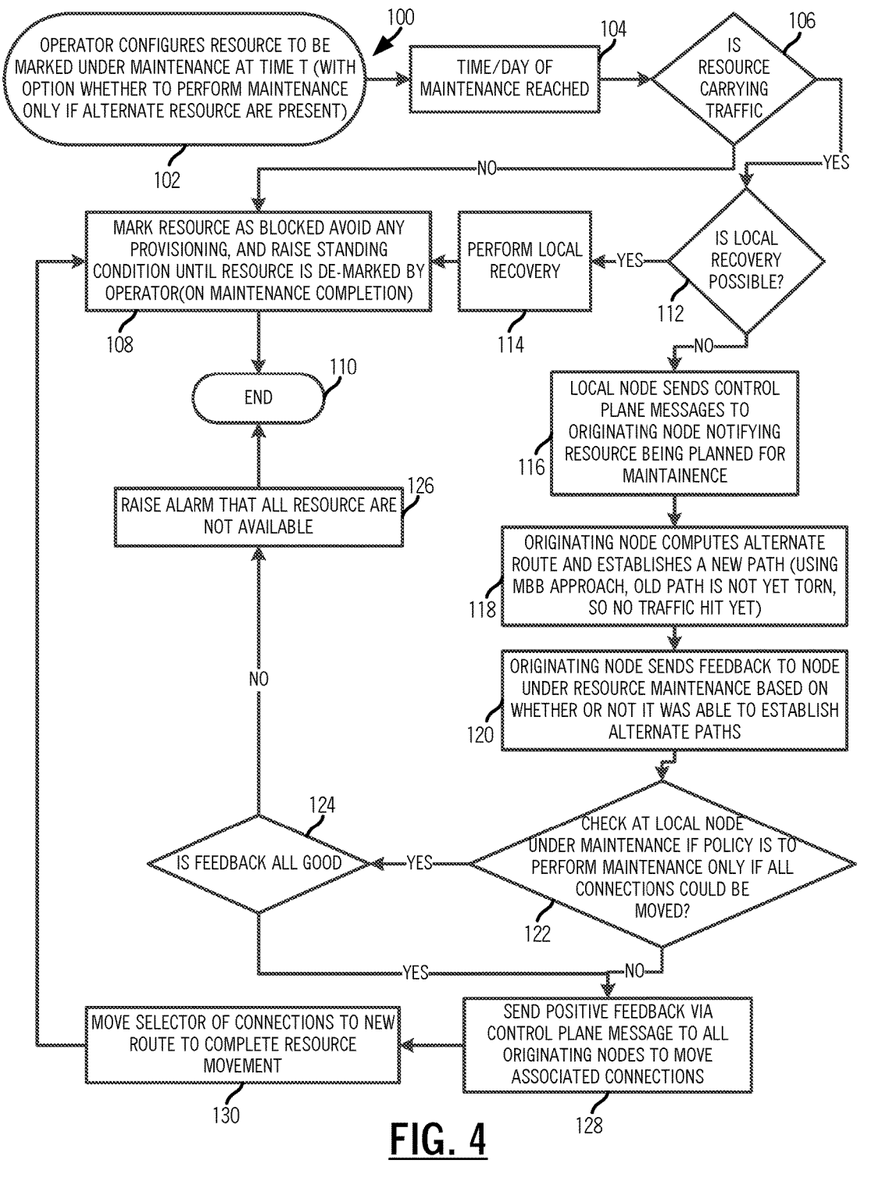
FIG. 4 is a flowchart of a maintenance process to accommodate connections associated with a resource undergoing maintenance.

Referring to FIG. 4, in an exemplary embodiment, a flowchart illustrates a maintenance process 100 to accommodate connections associated with a resource undergoing maintenance. The process 100 includes an operator configuring a resource to be marked under maintenance at a time T (with an option to perform maintenance only if alternate resources are present) (step 102). The operator can configure the resource via a Graphical User Interface (GUI) associated with an NMS, EMS, SDN controller, etc. The time T is when the maintenance is proposed, and T can be now if the maintenance is an unplanned emergency. The option can be set such that the maintenance is only prepared in the process 100 can accommodate all of the connections associated with the resources. Step 102 is performed in advance of the maintenance for planned events and at the start of maintenance for the unplanned emergency.

The process 100 waits until the time/day of the maintenance is reached (step 104). The process 100 checks if the resource is carrying traffic, i.e., are active connections associated with the resource (step 106). If the resource is not carrying traffic (step 106), the process 100 includes marking the resource as blocked to avoid any provisioning therein during the maintenance, and raising a standing condition until the resource is demarked by the operator (i.e., on maintenance completion) (step 108) and the process 100 ends (step 110). Here, the resource does not carry traffic, and the process 100 only needs to lock out the resource during the maintenance. The standing condition is raised to communicate that the resource planned for maintenance is ignored from routing. The standing condition can be automatically or manually removed on completion of the maintenance (or if the maintenance ends, is rescheduled, etc.).

If the resource is carrying traffic (step 106), all of the associated traffic has to be accommodated. First, the process 100 checks if local recovery is possible for the associated traffic (step 112). As described herein, local recovery includes making the resource available for maintenance (i.e., moving traffic off of the resource) without impacting the original route (i.e., requiring a network action to change the route). The local recovery can include, for example, for fibers/ports (i.e., optical modules) not carrying any traffic, locking out the ports from carrying traffic (i.e., stop advertising bandwidth on the port). For fiber/ports carrying traffic such as over an aggregated link, the local recovery can include Local Span Mesh Restoration (LSMR) or switch the protection, to another port. For fiber/ports carrying traffic not going over an aggregated link or not having enough bandwidth on the link 14, local recovery is not possible and the process 100 would have to revert to a network action to change the route. For the line modules 34, the aforementioned techniques can be performed for each of its ports. For the switch modules 36, the local recovery includes rebalancing switch traffic to other switch modules 36 in the node 30 to free up the switch module 36 for maintenance.

If the local recovery is possible (step 112), the process 100 includes performing the local recovery (step 114) and marking the resource as blocked to avoid any provisioning therein during the maintenance, and raising a standing condition until the resource is demarked by the operator (i.e., on maintenance completion) (step 108) and the process 100 ends (step 110). Here, steps 114, 108 contemplate accommodating all traffic associated with the resource. However, in some exemplary embodiments, the local recovery may be possible for none or only some of the traffic. In the case where local recovery is only possible for some of the traffic, the process 100 can perform local recovery (step 114) here and proceed to a network action for the remaining traffic. Note, local recovery is preferable to accommodate traffic as it has less impact on the network 10, i.e., local recovery only affects the node 30.

If local recovery is not possible or only possible for some traffic (step 112), the process 100 include the local node (i.e., the node 30 associated with the resource) sends control plane messages to originating node for each connection with a notification the maintenance is planned on the resource (step 116). Again, in the control plane 16, each connection can be controlled/managed by its originating node and to perform a network action to change the connection, signaling is required to the originating node. Here, the control plane 16 is used to take network action to change the route of connections where local recovery is not possible. The local node having equipment under maintenance sends a control plane message for each connection to the associated originating node, with information for computing an alternate route by avoiding the resource under maintenance.

The originating node computes an alternate route and establishes a new path (e.g., using an MBB approach where the old path is not torn yet so any traffic hit occurs at this point) (step 118). The originating node shall compute the alternate route with consideration of existing constraints such as the resource that needs to be avoided. In an exemplary embodiment, the MBB operation is used to minimize traffic hits while moving to a new route. The originating node can send feedback to the node under resource maintenance based on whether or not it was able to establish alternate paths (step 120).

Based on the feedback, the process 100 can check at the local node under maintenance if the policy is to perform the maintenance only if all of the connections could be moved (step 122). If the policy requires movement of all of the connections (step 122), and the feedback indicates not all connections could be moved (step 124), then the process 100 includes raising an alarm that all resources are not available for the maintenance (step 126), and the process 100 ends (step 110).

If the feedback indicates all of the connections could be moved (step 124) or if the policy does not require all of the connections to be moved (step 122), the process 100 includes sending positive feedback via control plane messages to all of the originating nodes to move the associated connections (step 128). The process 100 can include moving the selector of connections to associated new routes to complete resource movement for the maintenance (step 130) marking the resource as blocked to avoid any provisioning therein during the maintenance, and raising a standing condition until the resource is demarked by the operator (i.e., on maintenance completion) (step 108) and the process 100 ends (step 110).

Exemplary Maintenance Process

Figure 5:
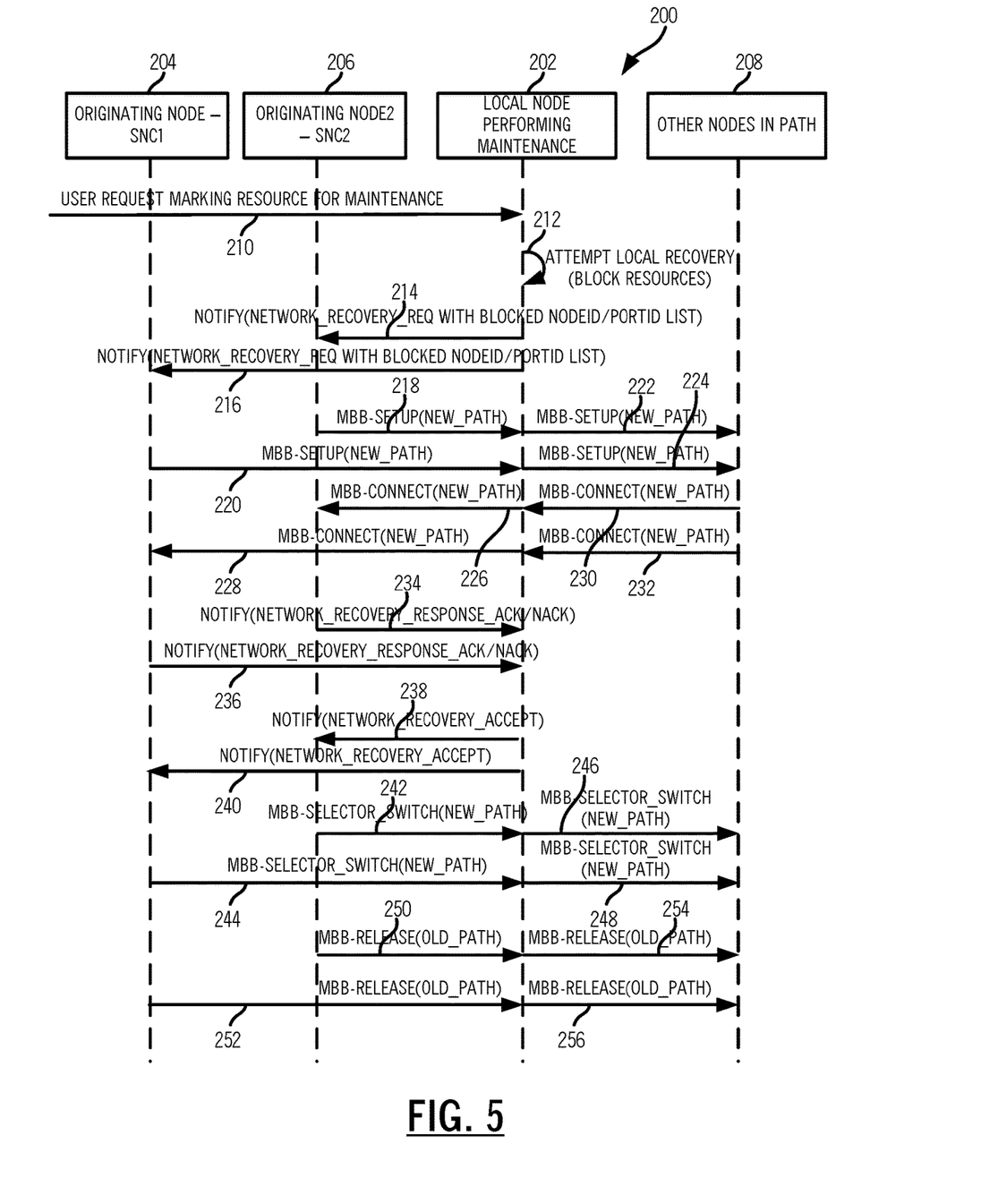
FIG. 5 is a flow diagram of an exemplary implementation of the process between a local node, originating nodes, and other nodes in an associated path.

Referring to FIG. 5, in an exemplary embodiment, a flow diagram illustrates an exemplary implementation 200 of the process 100 between a local node 202, originating nodes 204, 206, and other nodes 208 in an associated path. Here, in this example, the local node 202 is designated for maintenance on some of its resources, i.e., line cards, line modules, optical modules, switching fabrics, switching modules, fibers, ports, etc. This is determined based on a user request marking a resource for maintenance (step 210). First, the process 100, at the local node 202, attempts local recovery (to accommodate the connections associated with the resources and to block the resources during the maintenance) (step 212).

Assume some or none of the connections could be locally restored and that there are at least two connections (designated as SNC1, SNC2) which require network action for accommodation. After the local recovery attempt (and possible failure for these two connections), the local node 202 sends control plane messages to the originating nodes 204, 206 (steps 214, 216). The originating node 204 controls the SNC1, and the originating node 206 controls the SNC2. For example, the control plane messages in steps 214, 216 can be NOTIFY messages for a network recovery request with information such as blocked node (node ID), blocked ports (port ID) list, and the like. The NOTIFY message is sent to the originating nodes 204, 206 for the SNC1, SNC2.

The originating nodes 204, 206 are configured to determine new paths for the SNC1, SNC2, respectively, and to send a control plane message to set up the new paths (steps 218, 220, 222, 224). For example, the control plane message can be an MBB SETUP message with the new path. The originating nodes 204, 206 can transmit the MBB SETUP message to the local node 202 and to the other nodes 208 in the path.

The local node 202 and the other nodes 208 are configured to perform setup based on the control plane message to set up the new paths and to signal a control plane message subsequent to successful setup (step 226, 228, 230, 232). For example, the control plane message can be an MBB CON- NECTION message with the new path which is sent from the local node 202 and the other nodes 208 to the originating nodes 204, 206.

Once the originating nodes 204, 206 receive the control plane message indicating the success of setting up the new path, the originating nodes 204, 206 can, at that point or a future time, send a control plane message to implement the maintenance (steps 234, 236). For example, these control plane messages can be NOTIFY with an acknowledgment (ACK) for network recovery. The local node 202 and the other nodes 208 can respond with acceptance messages (steps 238, 240), e.g., NOTIFY messages with network recovery acceptance.

Now, the nodes 202, 204, 206, 208 have set up connections to accommodate all traffic associated with the resource. At the point of maintenance, the originating nodes 204, 206 can send control plane messages to cause actual implementation of the connections to the local node 202 and the other nodes 207 (step 242, 244, 246, 248). For example, these messages can be MBB SELECTOR SWITCH to the new path. Next, the originating nodes 204, 206 can send release messages to release the old path for the SNC1, SNC2 (steps 250, 252, 254, 256).

Process for Automatically Accommodating Connections

Figure 6:
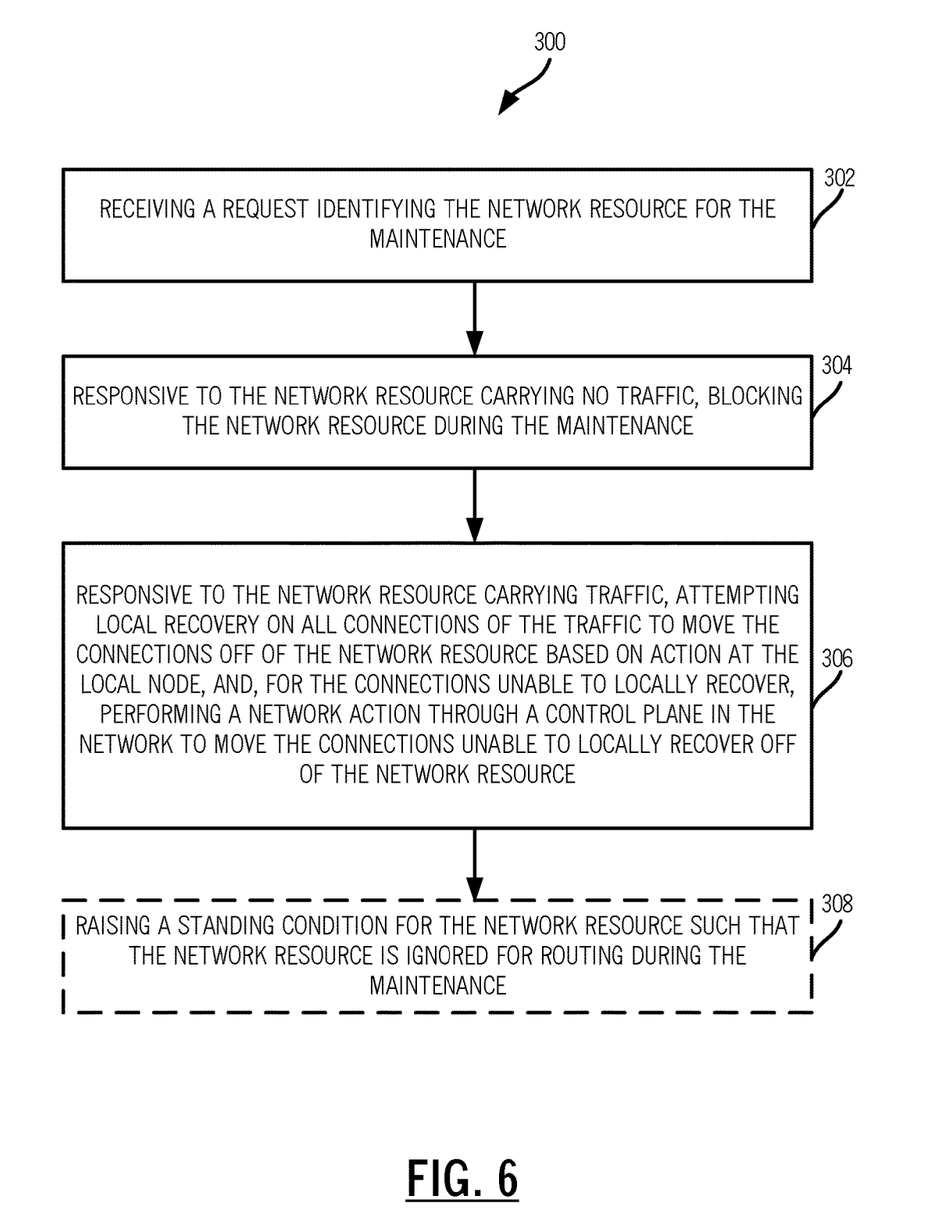
FIG. 6 is a flowchart of a process for automatically accommodating one or more connections associated with a network resource targeted for maintenance at a local node in a network.

Referring to FIG. 6, in an exemplary embodiment, a flowchart illustrates a process 300 for automatically accommodating one or more connections associated with a network resource targeted for maintenance at a local node in a network. The process 300 includes receiving a request identifying the network resource for the maintenance (step 302); responsive to the network resource carrying no traffic, blocking the network resource during the maintenance (step 304); and, responsive to the network resource carrying traffic, attempting local recovery on all connections of the traffic to move the connections off of the network resource based on action at the local node, and, for the connections unable to locally recover, performing a network action through a control plane in the network to move the connections unable to locally recover off of the network resource (step 306). The process 300 can also include raising a standing condition for the network resource such that the network resource is ignored for routing during the maintenance (step 308). The network resource can include one or more devices in a node in the network with the traffic associated therewith, and wherein the one or more devices include one or more of line cards, line modules, optical modules, switching fabrics, switching modules, fibers, and ports.

The request can be received from one or more of a Network Management System (NMS), an Element Management System (EMS), and a Software Defined Networking (SDN) controller and the request can include a time and day for the maintenance and a policy indication as to whether or not the maintenance proceeds if all of the traffic cannot be accommodated. The network action can be initiated through control plane messages to originating nodes for all of the connections unable to locally recover, wherein the control plane messages indicate the network resource for avoidance in computing a new path. The network action can be performed by originating nodes associated with each of the connections unable to locally recover, wherein the originating nodes are configured to compute alternative routes for the connections unable to locally recover exclusive of the local node. The network action can include Make-Before-Break (MBB) connections which are set up first for all of the connections unable to locally recover and then initiated via a selector switch after all of the MBB connections are setup.

The local recovery can include, for ports of the network resources not carrying traffic, locking these ports to avoid traffic during the maintenance, for ports of the network resources carrying traffic over an aggregated link, performing one of local span mesh restoration and protection switching, and, for switch modules of the network resources in the local node, rebalancing the traffic in the local node such that the switch modules are free of the traffic. The blocking, the attempting, and the performing can each be automatically performed based on the request.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for automatically accommodating one or more connections associated with a network resource targeted for maintenance at a local node in a network, the method comprising:
   receiving a request identifying the network resource for the maintenance;
   responsive to the network resource carrying no traffic, blocking the network resource during the maintenance; and
   responsive to the network resource carrying traffic, attempting local recovery on all connections of the traffic to move the connections off of the network resource based on action at the local node, and, for the connections unable to locally recover, performing a network action through a control plane in the network to move the connections unable to locally recover off of the network resource,
   wherein the network action is performed by originating nodes associated with each of the connections unable to locally recover, wherein the originating nodes are configured to compute alternative routes for the connections unable to locally recover exclusive of the local node.

2. The method of claim 1, wherein the network resource comprises one or more devices in a node in the network with the traffic associated therewith, and wherein the one or more devices comprise one or more of line cards, line modules, optical modules, switching fabrics, switching modules, fibers, and ports.

3. The method of claim 1, wherein the request is received from one or more of a Network Management System (NMS), an Element Management System (EMS), and a Software Defined Networking (SDN) controller and the request comprises a time and day for the maintenance and a policy indication as to whether or not the maintenance proceeds if all of the traffic cannot be accommodated.

4. The method of claim 1, wherein the network action is initiated through control plane messages to originating nodes for all of the connections unable to locally recover, wherein the control plane messages indicate the network resource for avoidance in computing a new path.

5. The method of claim 1, wherein the network action comprises Make-Before-Break (MBB) connections which are set up first for all of the connections unable to locally recover and then initiated via a selector switch after all of the MBB connections are setup.

6. The method of claim 1, wherein the local recovery comprises
   for ports of the network resource not carrying traffic, locking these ports to avoid traffic during the maintenance,
   for ports of the network resource carrying traffic over an aggregated link, performing one of local span mesh restoration and protection switching, and
   for switch modules of the network resource in the local node, rebalancing the traffic in the local node such that the switch modules are free of the traffic.

7. The method of claim 1, further comprising:
   raising a standing condition for the network resource such that the network resource is ignored for routing during the maintenance.

8. The method of claim 1, wherein the blocking, the attempting, and the performing are each automatically performed based on the request.

9. An apparatus adapted to automatically accommodate one or more connections associated with a network resource targeted for maintenance at a local node in a network, the apparatus comprising:
   circuitry adapted to receive a request identifying the network resource for the maintenance;
   circuitry adapted to block the network resource during the maintenance responsive to the network resource carrying no traffic; and
   circuitry adapted to attempt local recovery on all connections of the traffic to move the connections off of the network resource based on action at the local node, and, for the connections unable to locally recover, circuitry adapted to cause a network action through a control plane in the network to move the connections unable to locally recover off of the network resource, responsive to the network resource carrying traffic,
   wherein the network action is performed by originating nodes associated with each of the connections unable to locally recover, wherein the originating nodes are configured to compute alternative routes for the connections unable to locally recover exclusive of the local node.

10. The apparatus of claim 9, wherein the network resource comprises one or more devices in a node in the network with the traffic associated therewith, and wherein the one or more devices comprise one or more of line cards, line modules, optical modules, switching fabrics, switching modules, fibers, and ports.

11. The apparatus of claim 9, wherein the request is received from one or more of a Network Management System (NMS), an Element Management System (EMS), and a Software Defined Networking (SDN) controller and the request comprises a time and day for the maintenance and a policy indication as to whether or not the maintenance proceeds if all of the traffic cannot be accommodated.

12. The apparatus of claim 9, wherein the network action is initiated through control plane messages to originating nodes for all of the connections unable to locally recover, wherein the control plane messages indicate the network resource for avoidance in computing a new path.

13. The apparatus of claim 9, wherein the network action comprises Make-Before-Break (MBB) connections which are set up first for all of the connections unable to locally recover and then initiated via a selector switch after all of the MBB connections are setup.

14. The apparatus of claim 9, wherein the local recovery comprises
   for ports of the network resource not carrying traffic, locking these ports to avoid traffic during the maintenance,
   for ports of the network resource carrying traffic over an aggregated link, performing one of local span mesh restoration and protection switching, and
   for switch modules of the network resource in the local node, rebalancing the traffic in the local node such that the switch modules are free of the traffic.

15. The apparatus of claim 9, further comprising:
   circuitry adapted to raise a standing condition for the network resource such that the network resource is ignored for routing during the maintenance.

16. An apparatus adapted to automatically accommodate one or more connections associated with a network resource targeted for maintenance at a local node in a network, the apparatus comprising:
   circuitry adapted to receive a request identifying the network resource for the maintenance;

circuitry adapted to block the network resource during the maintenance responsive to the network resource carrying no traffic; and circuitry adapted to attempt local recovery on all connections of the traffic to move the connections off of the network resource based on action at the local node, and, for the connections unable to locally recover, circuitry adapted to cause a network action through a control plane in the network to move the connections unable to locally recover off of the network resource, responsive to the network resource carrying traffic, wherein the network action is performed by originating nodes associated with each of the connections unable to locally recover, wherein the originating nodes are configured to compute alternative routes for the connections unable to locally recover exclusive of the local node, wherein the local recovery comprises for ports of the network resource not carrying traffic, locking these ports to avoid traffic during the maintenance, for ports of the network resource carrying traffic over an aggregated link, performing one of local span mesh restoration and protection switching, and for switch modules of the network resource in the local node, rebalancing the traffic in the local node such that the switch modules are free of the traffic.

17. The apparatus of claim 16, wherein the network resource comprises one or more devices in a node in the network with the traffic associated therewith, and wherein the one or more devices comprise one or more of line cards, line modules, optical modules, switching fabrics, switching modules, fibers, and ports.

18. The apparatus of claim 16, wherein the request is received from one or more of a Network Management System (NMS), an Element Management System (EMS), and a Software Defined Networking (SDN) controller and the request comprises a time and day for the maintenance and a policy indication as to whether or not the maintenance proceeds if all of the traffic cannot be accommodated.

19. The apparatus of claim 16, wherein the network action is initiated through control plane messages to originating nodes for all of the connections unable to locally recover, wherein the control plane messages indicate the network resource for avoidance in computing a new path.

20. The apparatus of claim 16, wherein the network action comprises Make-Before-Break (MBB) connections which are set up first for all of the connections unable to locally recover and then initiated via a selector switch after all of the MBB connections are setup.

\* \* \* \* \*